Sept. 8, 1953 — R. B. DODDS ET AL — 2,651,470
METHOD FOR MILLING WHEAT
Filed May 26, 1949 — 5 Sheets-Sheet 1

INVENTORS
Robert B. Dodds
BY Arthur N. Hibbs
Blair + Black
ATTORNEYS

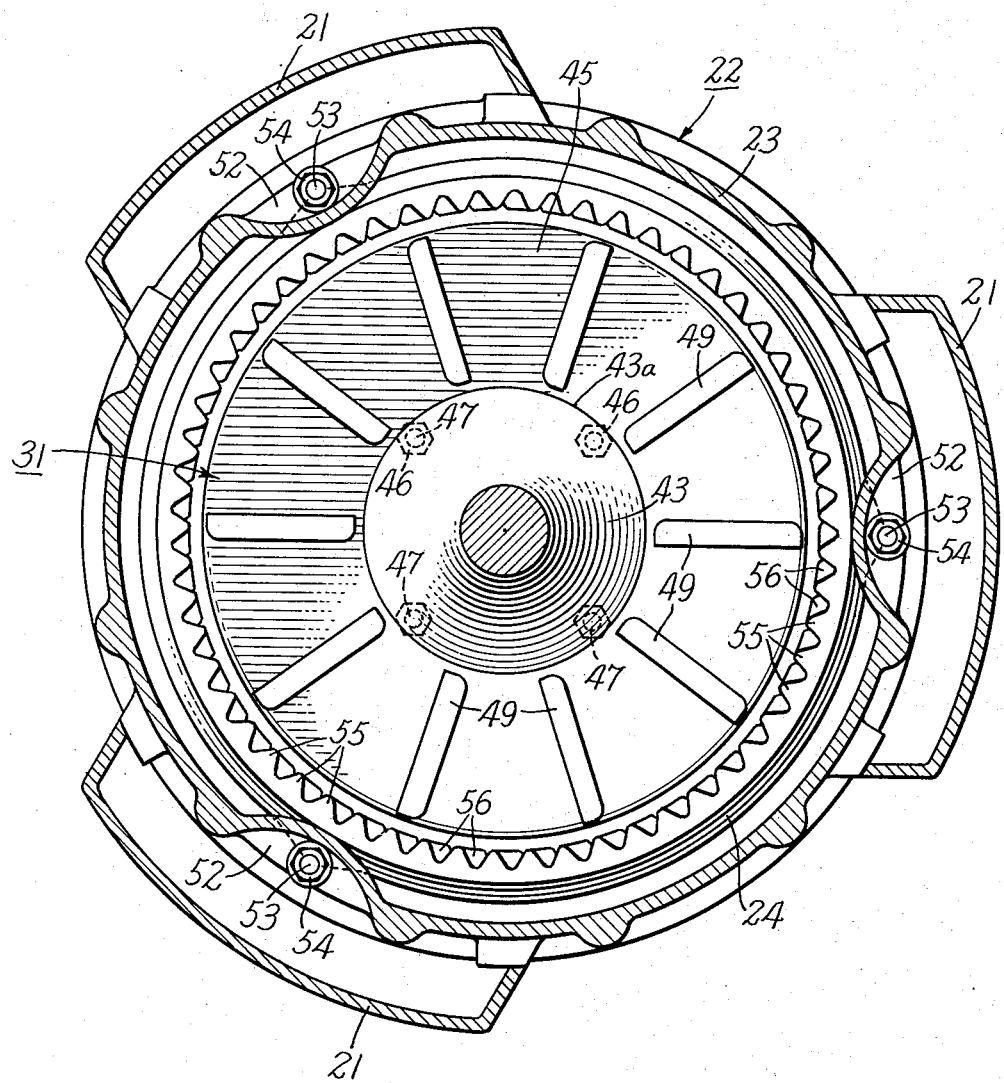

Sept. 8, 1953     R. B. DODDS ET AL     2,651,470
METHOD FOR MILLING WHEAT
Filed May 26, 1949     5 Sheets-Sheet 3
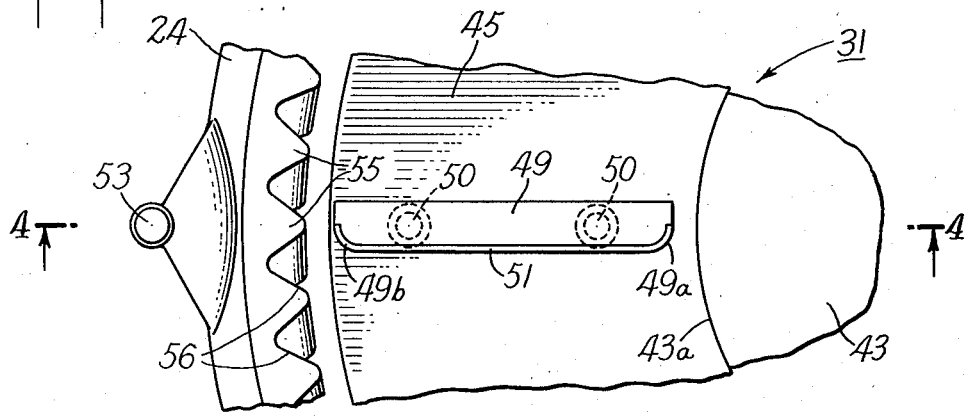
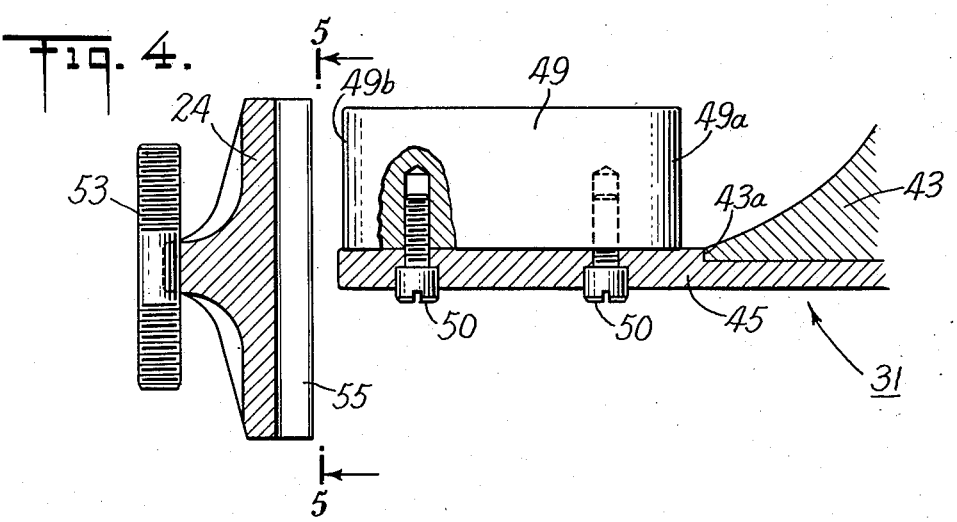
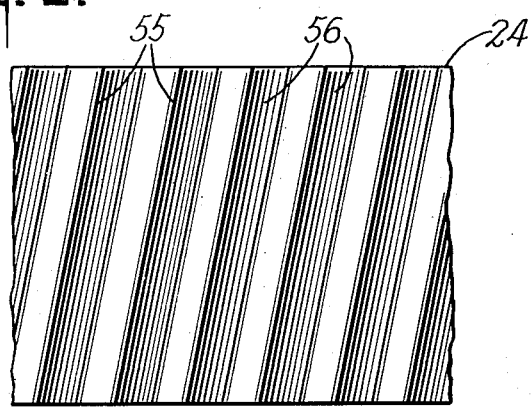
INVENTORS
Robert B. Dodds
BY Arthur N. Hibbs
Blair + Black
ATTORNEYS Sept. 8, 1953 — R. B. DODDS ET AL — 2,651,470
METHOD FOR MILLING WHEAT
Filed May 26, 1949 — 5 Sheets-Sheet 4

INVENTORS
Robert B. Dodds
BY Arthur N. Hibbs
Blair + Black
ATTORNEYS

Sept. 8, 1953  R. B. DODDS ET AL  2,651,470
METHOD FOR MILLING WHEAT

Filed May 26, 1949  5 Sheets-Sheet 5

INVENTORS
Robert B. Dodds
Arthur N. Hibbs
BY
Blair & Black
ATTORNEYS

Patented Sept. 8, 1953

2,651,470

UNITED STATES PATENT OFFICE 2,651,470

METHOD FOR MILLING WHEAT

Robert B. Dodds, Woodbridge, and Arthur N. Hibbs, Mount Carmel, Conn., assignors to The Safety Car Heating and Lighting Company, Inc., New Haven, Conn.

Application May 26, 1949, Serial No. 95,444

1 Claim. (Cl. 241—5)

This invention relates to apparatus for the shattering of material particles, and more particularly to an impact mill for breaking cereal grains, such as wheat grains.

It is conventional in milling processes to employ roller mills wherein the rolls are fluted or smooth, and are spaced by varying amounts, depending on the stage in the breaking or reduction of the grain. While such roller mills operate with a fair degree of efficiency, they mill the grain with an excessive amount of attrition, friction, contamination and scuffing, which produce excessive amounts of undesirable products; this, of course, results in a lessened percentage of desirable products from which patent floor is made. When the whole grains are passed through the breaker rolls, usually corrugated, of a roller mill, several things customarily happen. The reducing force of the break rolls is primarily a crushing, shearing, tearing, cutting action. The flutes of the slow roll cut into and hold the kernel while the flutes of the fast roll cut and grip the other side of the kernel, which breaks or tears open the kernel. As a result the kernel is reduced indiscriminately by a crushing, tearing, scraping action. This results in the production of bran flour, fines and perhaps other material that is undesirable at the break operation. As the produce passes from one set of break rolls to the next, the same thing occurs at succeeding breaks. Some of the endosperm will, of course, be cleanly separated from the bran, but inevitably, because of the scraping action of the rolls, a certain amount of bran flour and fines will be produced, production of this material at the break operation of a mill stream being undesirable and uneconomical because of its contaminating effect and reduction of ultimate patent flour percentage. Then too, these roller mills require a relatively large amount of power for operation and are costly to maintain because of wear and the necessity for keeping the rolls in proper alignment and adjustment.

Another type of mill has also been used, although to a lesser extent, namely the so-called impact mill. Such mills are characterized by rotors which rotate in either a horizontal or vertical plane, the grain being so fed to the rotors that by centrifugal action the individual grains are projected at high velocity against impact surfaces, tending to break the grain particles into fragments. The difficulty in such mills of which we are presently aware lies in excess production of undesirable material because of excessive attrition and friction action of the cereal grains rebounding into the rotor, piling up on the impact surfaces, and striking one another. In other words, it is characteristic of these mills that after a short period of operation there is not a clear impact surface against which the grains may be projected.

It is accordingly an object of our invention to provide an impact mill by which cereal grains can be efficiently broken without the production of undesirable material by attrition or friction. Another object is to provide a mill of this nature whose simplicity and ruggedness of structure ensure economical, extended and reliable operation. Another object is to provide an impact mill that is well adapted for installation in an established millstream, in conjunction with the various types of apparatus normally used in such a stream. A still further object is to provide a machine of the above nature that is capable of reducing to fragments material particles other than cereal grains. Other objects of the invention will be in part apparent and in part pointed out hereinafter.

The invention accordingly consists in the features of construction, combinations of elements, and arrangements of parts, as will be exemplified in the structure to be hereinafter described, and the scope of the application of which will be indicated in the following claim.

In the drawing, wherein we have shown one form of our invention,

Figure 2 is a horizontal section taken along the line 2—2 of Figure 1;

Figure 3 is an enlarged horizontal section showing one of the rotor blades and its relation to adjacent impact surfaces on the impact liner;

Figure 4 is a vertical section taken along the line 4—4 of Figure 3;

Figure 5 is a fragmentary vertical section taken along the line 5—5 of Figure 4;

Similar reference characters refer to similar parts throughout the several views of the drawing.

In accordance with one form of our invention, the impact mill includes a casing having one or more inlets through which the grains flow into the casing, and an outlet for the products of fragmentation. A rotor is rotatably mounted within this casing in a position to receive the inflowing grains, and this rotor has fastened thereto in planes passing through its axis a plurality of vanes or blades which, upon rotation, impel the grains outwardly of the rotor axis. An impact liner is secured to the casing around the periphery of the rotor, this liner having angularly disposed impact surfaces against which the grains are impelled and broken, the products of this breakage being directed downwardly from the liner to the casing outlet.

The function of the impact liner is two-fold. First of all, it stops each high velocity particle to be broken, thus causing the elastic limit of the particle to be exceeded, and the fracture accordingly accomplished along lines of least resistance, i. e. the particles or kernels are broken down along lines of natural division or lines of least cleavage. Secondly, by virtue of the angular relation of the impact surfaces of the liner to the resultant velocity of the particles, the liner provides for the quick removal of the broken material so that oncoming particles will strike only a clear surface and not the broken product. These impact surfaces of the liner are provided by corrugations on the inner periphery of the liner, the impact faces of the corrugations being inclined from the vertical at such an angle to the resultant velocity of the particles as to cause the particles to strike the surface obliquely. Thus the fragments are directed downwardly and outwardly of the rotor, thereby clearing the way for oncoming particles. The only friction the particles encounter in this type of breaking occurs during the acceleration of the particles along the rotor blades, as neither the particles nor the fragments thereof can bounce back into the rotor or into the oncoming stream of particles being impelled by the rotor. Thus the grains may be broken with but negligible production of undesirable material.

Figure 10:
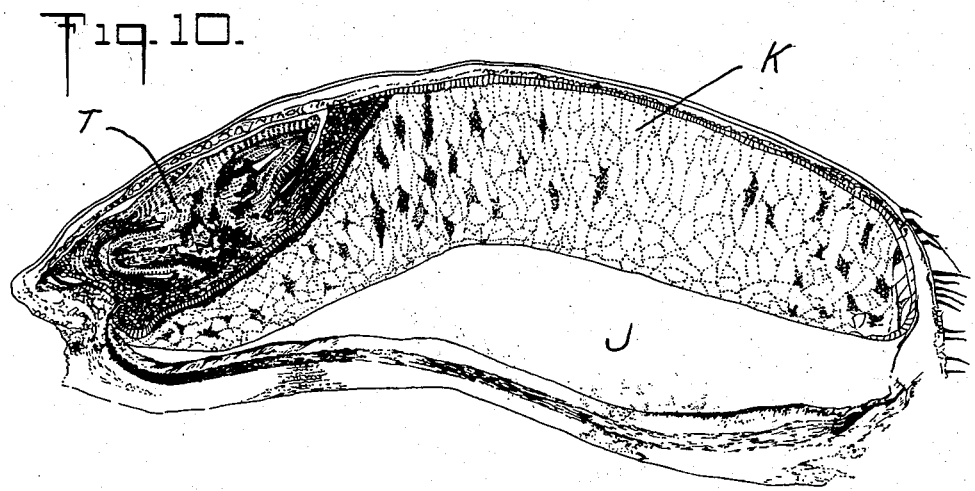
Figure 10 is a greatly enlarged longitudinal section of a wheat grain.
Figure 11:
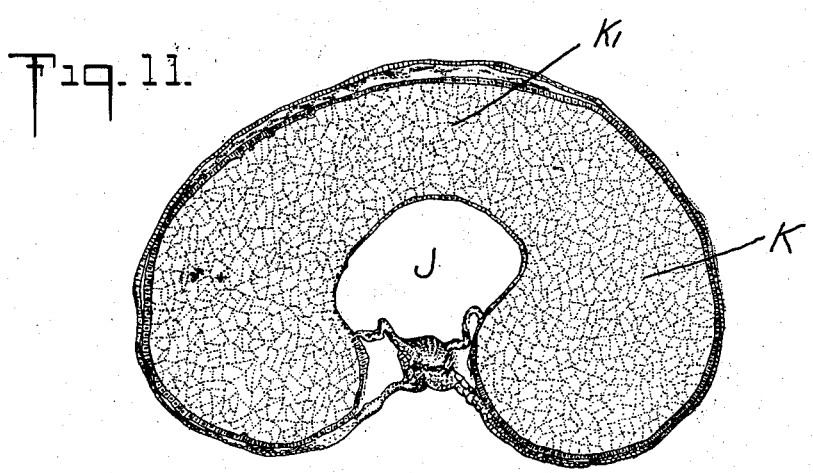
Figure 11 is a vertical section taken along the line 11—11 of Figure 10.
Figure 12:
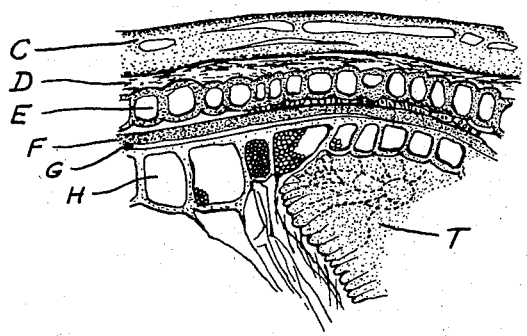
Figure 12 is a further enlarged fragmentary longitudinal section showing certain details of the structure of the wheat grain in the vicinity of the germ.

In order to clarify certain aspects of our invention, we have reproduced in Figures 10 through 12 certain structural characteristics of a wheat grain, this, however, for illustrative purposes only, as it is to be understood that our impact mill is equally well adapted to the reduction and/or processing of other types of discrete particles. As shown in Figure 12, the wheat grain is provided with an outer protective covering formed of layers C, D and E, as well as an inner coating comprising layers F, G and H. Without describing in detail these several layers, it will suffice to state that these layers constitute what is known as bran B (Figure 10), and form a protective covering for the grain. Within this protective covering lie the endosperm K and the germ T.

The endosperm K is composed of a lace-like arrangement of cells laid out in such a manner that their long axes are at right angles to the bran layers. These cells are packed with starch granules of different sizes and shapes and comprise accordingly the principal part of the grains that ultimately makes the best grade of flour. The endosperm is friable, and on impact tends to break along lines of least cleavage in the form of crystalline fragments whose surfaces follow the cellular divisions defined by the cell walls.

The germ T (Figure 10) is encased in the lower end of the dorsal side of the grain, where it is protected, as pointed out above, by the several layers comprising the bran. The back end of the germ is in intimate contact with the lower end of the endosperm K, but is not actually joined to the endosperm and hence is readily separable therefrom upon impact. The other principal characteristic of the wheat grain is the crease J (see Figure 11) which divides the grain into two main sections, leaving a relatively weak area in the endosperm region, as indicated at $K_1$.

The desired result in the milling process is, of course, to separate the bran, endosperm and the germ from one another, leaving the germ intact, and breaking the endosperm to the desired fineness, while at the same time producing a minimum amount of bran flour and impurities. This we efficiently accomplish through the use of our impact mill by tempering the grain, i. e. moistening it so that the bran becomes somewhat leathery, while leaving the endosperm in a mellow, friable condition. With the grains in this condition, they tend to break on impact along lines of least resistance, i. e. along the crease in the endosperm region $K_1$, with the endosperm fragments parting from the bran layer, and the germ splitting off as an integral unit. We have found that when the grains are impelled with sufficient velocity against the impact liner, their elastic limit is exceeded, and the different parts of the grain are broken in the manner noted, with a minimum production of undesirable material because of minimum attrition and friction on the grains as they pass through the mill.

Figure 1:
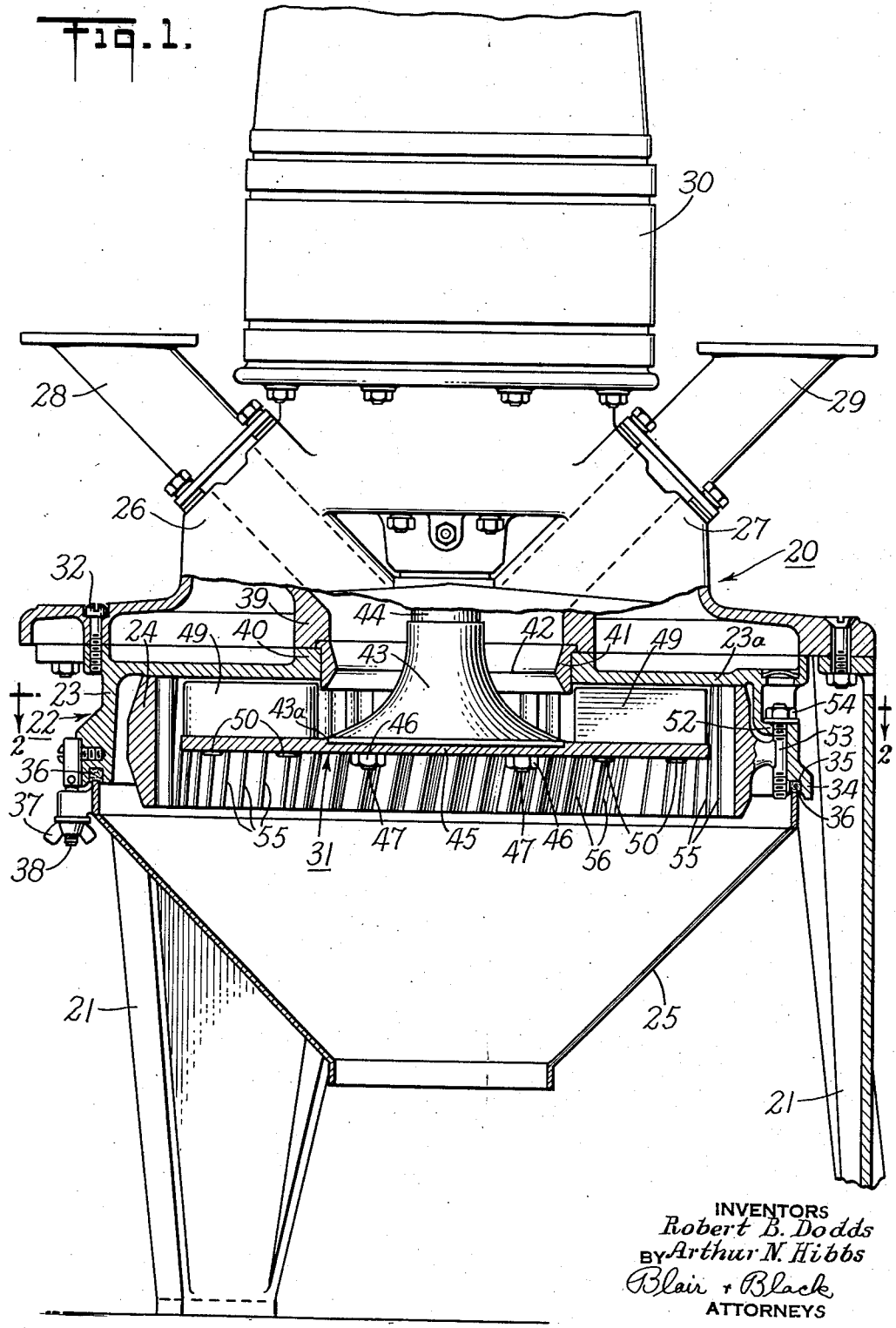
Figure 1 is a partially sectioned front elevation of our impact mill showing the operative relation of the rotor and impact liner.

Referring now to Figure 1, our impact mill comprises in general a body casting generally indicated at 20, which is secured to and supported by suitable legs 21. To the body casting is detachably secured a liner assembly, generally indicated at 22, and comprising a casing 23 and a liner 24. A downwardly extending hopper 25 is secured to the casing 23. At the upper portion of body casting 20 are necks 26 and 27 fixed respectively to which are inlets 28 and 29. Between the necks 26 and 27, body 20 supports a motor 30, and to the armature of this motor is fastened a rotor generally indicated at 31. Thus grain fed into the mill through necks 26 and 27 passes downwardly to rotor 31 which, by centrifugal action, impels the grain against the inner periphery of liner 24, from which the products fall through hopper 25 for suitable subsequent processing.

The impact liner casing 23 is detachably secured to body casting 20 as by screws 32, thus providing for ready assembly or dis-assembly of these two parts. Casing 23 has a bottom flange 34 within which is formed a groove 35 having a gasket 36 set therein, against which the upper edge of hopper 25 bears. The hopper is detachably fastened to the casing by a suitable number of wing nuts 37, threaded onto screws 38 carried by casing 23.

Body 20 and casing 23 include throat portions 39 and 40, respectively, the two clamping there between a collar 41 which tapers inwardly to a ridge 42 which helps to distribute the incoming grain and direct it to the hub of rotor 31. Thus the throat portions 39 and 40, together with collar 41, comprise a common inlet for produce fed into the mill and surround a hub 43 carried by the lower end of a shaft 44 which is in turn secured to the armature of motor 30. A rotor plate 45 is fastened to the bottom of hub 43 as by nuts 46 threaded on studs 47 carried by hub 43 and projecting through suitable holes in plate 45. Hub 43 is preferably so formed as to present a smooth outwardly tapering surface 48, originating as a substantially vertical cylindrical surface 48a, and terminating in substantially the horizontal plane of the top surface of plate 45. Through the provision of this type of surface, the individual grains which feed downwardly through the machine throat to the rotor hub in a steady stream are given initial components of radial and angular velocity in a smooth uniform stream directed toward the outer portions of the rotor.

As is more clearly shown in Figure 2, the top of rotor plate 45 supports a plurality of blades 49, each of which lies generally in a plane passing through the axis of the rotor; in other words, each blade extends along a radius of the rotor plate 45. Each of these blades, as shown in Figure 4, is secured to rotor plate 45 by screws 50 extending upwardly through the plate and threadably into the blade. The blade preferably extends substantially from the periphery of rotor plate 45 to a point just short of the edge 43a of rotor hub 43, thus being in a position to substantially immediately pick up the grains and increase their radial and angular velocity as they leave the lower edge of the rotor hub. As pointed out hereinabove, the rotor hub because of its outwardly tapering surface, imparts initial radial and angular velocity to the grains, hence there is little or no breakage of the grains at the inner edge of rotor blades 49, and accordingly little or no attrition or reduction of the grains at this point. Further to avoid attrition or impacting of the grains by the inner edges of the blades 49, each of these blades, as shown in Figure 3, has its inner edge rounded as at 49a. Thus there is no sharp edge which might otherwise deleteriously affect the grains at this point in their passage through the mill.

In view of the fact that rotor 31 is rotated at substantial speeds, e. g. of the order of 3500 R. P. M., we have found it preferable also to round the outer edge 49b of each of rotor blades 49 to preclude attrition at this point. In view of the fact that there is some friction between the grains being impelled by the faces of the rotor blades, we prefer to apply a hardened facing 51 on the leading surface of each of rotor blades 49. Facing 51 is formed of a material that with the grains has a low co-efficient of friction, thus precluding any damaging amount of attrition of the grains because of friction with the blades as the grains are impelled. It may accordingly be seen that when the grains leave the rotor, they have attained a very substantial velocity.

The velocity of each impelled grain as it leaves the rotor is a resultant having components of angular and radial velocity. The angular velocity at the point of departure would, of course, be tangent to the rotor at that point, and the radial velocity would be 90° from such tangent. Hence the actual or resultant velocity of each grain lies somewhere between the tangent and radius. Considering solely the angular and radial velocities of the grain, the resultant would then be displaced 45° from the tangent and associated radius, but because of the slight friction between the grains and the rotor surfaces during the passage of the grain therethrough, the radial velocity of the grain is reduced from the value it would otherwise take. Hence the resultant velocity of the grain forms with the tangent an angle which is somewhat less than 45° at the point where the grain departs from the rotor. Also, this actual resultant velocity of the grain will vary somewhat in direction as a function of rotor diameter and rotor speed.

As will be pointed out hereinafter, because of the departure angle of each grain, as determined by its resultant velocity, it is important to predetermine the operative position and attitude of the impact surfaces of the liner, the structural features of which will now be described in detail.

As shown in Figures 1 and 2, liner casing 23 has formed thereon illustratively three bosses 52, each of which is adapted to receive one end of a double-ended stud 53 secured to liner 24; thus three of these studs 53 are received respectively in casing bosses 52. On each stud is threaded a nut 54, the several nuts being taken up against their respective bosses 52 until the top edge of liner 24 is firmly seated against the top 23a of casing 23, thus firmly to hold the liner in proper operative position within the casing relative to rotor 31. By making the double-ended studs 53 integral parts of liner 24, and by fastening the liner with nuts 54 exteriorly of the liner casing 23, there is no danger of any studs or nuts or other fastening devices becoming loosened by vibration and dropping into hopper 25 and accordingly entering the millstream. It will also be noted that the axial length of liner 24 is substantially twice the depth of rotor plate 45 and blades 49 which enables the liner to be reversed and reset the casing after the initial upper side has become too worn for further efficient action.

As shown in Figures 2, 3 and 4 liner 24 is annular in shape so as to fit snugly within its casing 23. The inner periphery of the liner has formed thereon a plurality of protuberances which may take the form of a series of corrugations 55, each of which presents an impact surface 56 facing the direction of rotation of rotor 31. While the number of corrugations 55 on the liner may vary within certain limits, the smallest dimension of each impact surface of the corrugations should not be less than the greatest diameter of the grain or other particle impacted thereby, and preferably such dimension of the impact surface should exceed the greatest dimension of the grain. By so dimensioning the impact surfaces of the liner, a more solid impact of each grain is assured, and the fragments are more readily cleared from the impact surfaces. Also, as is more clearly shown in Figure 3, there are no sharp edges between adjacent surfaces of corrugations 55. In other words, the apex of each corrugation is rounded as is also the valley between adjacent corrugations. By rounding the apices of the corrugations, attrition of the grain is very substantially reduced and better impact results. By rounding the valleys between adjacent corrugations, the tendency for broken grain particles to build up therein is substantially obviated.

As pointed out hereinabove, the impact liner has two functions, first to break the particle, and second to effect quick removal of the fragments, not only to prevent their being hit by oncoming particles or grains, but also to prevent the fragments from rebounding into the path of the rotor blades, which would result in non-uniform breakage and the production of undesirable fines and other unwanted products. It is, of course, true that to reduce the resultant velocity of a grain to zero would necessitate positioning the impact surface in a plane exactly at right angles to the trajectory of the grain. However, when the impact surface is so positioned, we have found that the fragments do not clear readily from the impact surfaces, but tend to build up and accordingly cushion the impact of succeeding grains, and also tend to rebound into the path of the rotor blades. Accordingly, to remedy these two highly undesirable conditions, the corrugations 55 are so cast or otherwise formed on the surface of the liner that their impact surfaces 56 are inclined from the vertical, as shown in Figure 5. Furthermore, the number of corrugations are so chosen, and the angle included between the opposite surfaces of each corrugation is such that each impact surface lies in a plane that is not normal to the resultant velocity of the particle, i. e. the particle or grain in striking the impact surface strikes it somewhat obliquely so that its fragments after impact have both vertical and horizontal components of rebound. Expressed in another way, the plane of the impact surface forms with the resultant velocity of the impelled grains a vertical angle and a horizontal angle each of which is greater than 90°. Hence, there will be a resultant rebound velocity of the grain fragments directed outwardly and downwardly of the rotor, precluding packing of the fragments on the impact surface and rebounding thereof into the path of the rotor blades.

Of course, the velocity of the grain fragments will be very materially less than the original resultant velocity of the grain so that the combination of the resultant rebound velocity and the force of gravity rapidly clears the grain fragments from the impact surfaces. Then too, if there is any stage of infestation in the grain product, it will be crushed and killed by impact at the time of the breaking or reduction of the grains.

In one form of our mill, which in operation attains highly satisfactory results, a 12″ diameter rotor, carrying ten blades, is driven at 3500 R. P. M. Tests indicate that the material leaves the rotor at an angle of the order of 31° from the tangent, thus indicating the effect of the friction between the material and the blades in retarding the component of radial velocity. As it is desirable to use a liner having a minimum number of corrugations presenting a maximum size impact surface in order to obtain uniform treatment, a liner having fifty-four teeth or corrugations, whose impact surfaces were approximately one-half inch wide was used. Each of these impact surfaces was inclined, as hereinbefore described, at approximately 20° from the vertical and at an angle of the order of 35° horizontally with respect to the radius of the rotor particularly through the center of the face of the impact surface. Under such conditions it was found that there was no piling up of the material in the impact zone of the impact surface or deflection back into the path of the rotor blades. Under these conditions the grain fragments included a relatively small percentage of whole kernels and fines, by far the greater percentage comprising particles that would not go through a sixteen wire screen. In additional tests with the same mill, different types of liners were used. These liners differed in number of corrugations, angle of inclination of the impact surfaces from the vertical and face angle of the surfaces. Good results were obtained with angles of inclination from the vertical ranging from 15° to 25° and surface angles ranging from 30° to 45°. While percentage of extraction, i. e. production of fines was lowest at the upper limit of angle of inclination from the vertical percentage of whole kernels was relatively high. As the angle of inclination was decreased, percentage of extraction rose somewhat indicating that at least for the type of grain used in the tests an angle of inclination of less than 15° would give uneconomical results, particularly in view of the fact that at this lower limit whole kernel percentage was higher than desirable. The reason for this is that as the impact surfaces approach the vertical they are more nearly normal to the trajectory of the impelled kernels. As a consequence the impacted kernels do not clear the impact surfaces as rapidly, and thus tend to form a cushion causing a higher percentage of unbroken kernels. Also, some of the broken kernels bounce back into the rotor and are reimpelled, thus causing the increase in extraction percentage.

While variation of the face angle of the impact surfaces between 30° and 45° has but little effect on percentage of extraction, percentage of whole kernels varied somewhat, although within economical limits. At the extremes of the range, the whole kernel percentage, with the particular grain used in the tests, was somewhat higher than where face angles of 35° to 40° were used. This indicates that at the middle of the range the obliquity of the face angle to the kernel trajectory was such that maximum breakage was obtained with minimum extraction (production of fines).

Thus the tests seem to indicate that the liner corrugations should be inclined from the vertical at an angle of the order of 20° with their face angles of the order of 35° to obtain optimum results. It is to be understood, however, that we do not set out these values in a limiting sense, particularly in view of the fact that satisfactory results were obtained throughout the ranges noted hereinabove.

Upon examination of the broken grains or kernels, it was found that by far the greater percentage thereof were broken horizontally along the region $K_1$ (Figure 11) of the endosperm, indicating that regardless of where the individual grains hit the impact surfaces the resultant stress was most effective in this region $K_1$ to break the grain. The examination of the broken grains also indicated that the germ in most all instances separated intact from the kernels. These results represent the criterion for a first break operation in a milling operation, and are far superior to those normally attained by use of other types of mills. The fact that there was but a small percentage of whole kernels, as well as a small percentage of fines, indicates not only minimum attrition, but also highly efficient deflection of the unbroken kernels, as well as fragments or broken kernels, away from the impact zone and the rotor blades.

Figure 6:
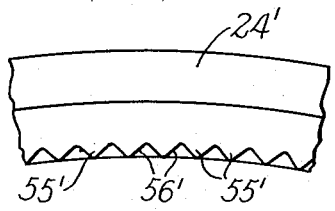
Figure 6 is a fragmentary top plan view of a a modified form of impact liner.
Figure 7:
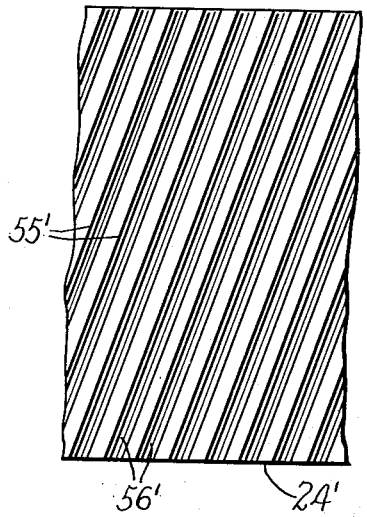
Figure 7 is a fragmentary elevation of the impact surfaces of the liner shown in Figure 6.

Our mill, of course, is well adapted for additional break operations after the first break, as well as for use in what is called the reduction of the broken grains or kernels. After the first break wherein the kernels split along the crease, as described, the next break operation shatters the broken grains to the end of separating the endosperm K (Figure 10) from the bran layer B. When conventional roll mills are used for this operation, the endosperm is in effect scraped away from the bran, and during such action the rolls inevitably scrape particles of the bran, thus introducing by attrition undesirable material into the millstream. When, however, the broken grains are impacted in our mill, the elastic limit between the cellular structure H intervening the bran layer and the endosperm is exceeded so that the endosperm is broken away along lines of least cleavage from the bran in relatively coarse crystalline-like particles ideal for purification and reduction in subsequent operations wherein the endosperm, termed middlings, is processed into patent flour. By the same token, this clearcut breaking away of the endosperm from the bran without any scraping action avoids the production of undesirable material, making it easy to separate the bran from the middlings by conventional methods.

Where our impact mill is to be used to reduce the relatively large endosperm particles, i. e. middlings, we have found it advantageous to use an impact liner, such as is shown in Figures 6 and 7. In Figure 6, the linear 24' is provided with corrugations 55', and while these corrugations, or rather their impact surfaces, bear the same angular relationship to the resultant velocity of the material being projected thereagainst, in this illustrative instance the middlings, such surfaces have a lesser width than impact surfaces 56 of corrugations 55 (Figure 3). From Figure 7 it may be seen that these surfaces 56' are inclined from the vertical as described in connection with surfaces 56 of liner 24 (Figure 5).

Figure 8:
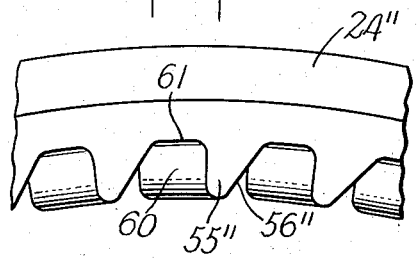
Figure 8 is a fragmentary top plan view of still another form of impact liner.
Figure 9:
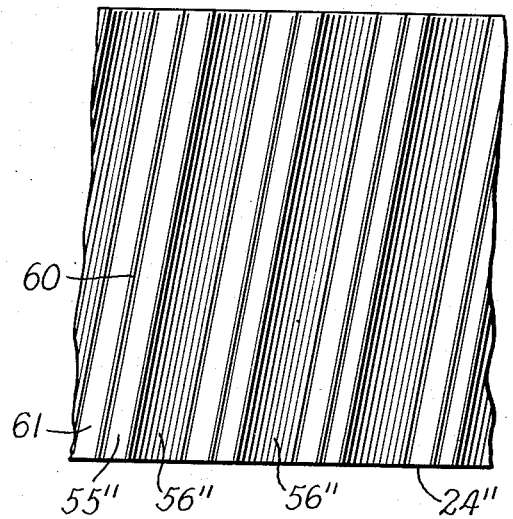
Figure 9 is an elevation of the impact surfaces of the liner shown in Figure 8.

In Figures 8 and 9, we have shown still another form of impact liner. Here the liner 24" has corrugations 55" provided with impact surfaces 56" which bear the same angular relationship to the resultant velocity of the material as impact surfaces 56 of corrugations 55 (Figure 3). The opposite surfaces 60 of corrugations 55" (Figure 8), however, are generally radial, thus providing peripheral spaces 61 which advantageously and efficiently comprise channels of ample capacity through which the fragments of the impacted particles may exit from the impact liner. Corrugations 55", or rather their impact surfaces 56", lie in planes having the inclinations described in connection with impact surfaces 56 of liner 24 (Figure 5).

From the foregoing it will now appear that the specific embodiment of our impact mill is well embodied to carry out our method of shattering discrete particles where it is desired to break or reduce a given particle from an initial form into either its constituent parts or into smaller sized fragments. Thus, in accordance with the practice of one form of our method, particles of material are fed toward and into a treating zone which particles, as they move toward the treating zone, have their direction of movement gradually changed and their motion initially accelerated. As the movement of the particles continues, they are subjected to centrifugal action so that each particle is rapidly accelerated so as to attain very substantial angular and radial velocity. When the particles have attained a certain peak velocity, the effect of the centrifugal action is stopped so that the particles are projected with a resultant velocity, the components of which are the final angular and radial velocities resulting from the effect of the centrifugal action. Then the resultant velocity of each particle is suddenly reduced substantially to zero by a reactionary force which causes the elastic limit of the particles to be exceeded, the particles accordingly shattering along lines of least cleavage. This reactionary force is applied in such a direction relative to the resultant velocity of the particles that the fragments of the shattered particles are directed along a path that is oblique to the resultant velocity of the particles and away from the direction of the exertion of the centrifugal action, thus to prevent the fragments of the shattered particles remaining in the path of the resultant velocity, or entering the path of the effect of the centrifugal action.

Thus it may be seen that we have attained the several objects set forth hereinabove in a thoroughly practical and efficient manner.

We claim:

The herein disclosed method of milling moisture conditioned wheat which includes the steps of flowing the wheat on to a rotating rotor disc so as to impart velocity to the wheat grains radially of the axis of rotation of said rotor, centrifugally impelling the grains so that each grain takes a path at an angle of the order of 30° to the tangent and in a horizontal plane and at a velocity of the order of at least 12,000 feet per minute, individually impacting each particle against a hard surface inclined in both the vertical and horizontal, deflecting the particles and their fragments downwardly and outwardly, the deflection downwardly being effected by the surface having an angle of inclination of the order of 15° to 25° to said horizontal plane, the deflection outwardly being effected by having the surface facing the path of the grain at an angle of 30° to 45° to the radius of the disc through the center of the surface, whereby a grain hitting said surface is broken and the fragments thereof are directed away from the impact surface and the rotor.

ROBERT B. DODDS.
ARTHUR N. HIBBS.

References Cited in the file of this patent

UNITED STATES PATENTS

| Number | Name | Date |
|---|---|---|
| 616,658 | Gates | Dec. 27, 1898 |
| 745,075 | Schutz | Nov. 24, 1903 |
| 964,102 | Gordon | July 12, 1910 |
| 1,081,860 | O'Neill | Dec. 16, 1913 |
| 1,267,110 | Parsons et al. | May 21, 1918 |
| 1,431,444 | Coursey | Oct. 10, 1922 |
| 1,636,033 | Agnew | July 19, 1927 |
| 2,357,843 | Morrissey | Sept. 12, 1944 |
| 2,383,437 | Alexander | Aug. 28, 1945 |
| 2,421,014 | Coss et al. | May 27, 1947 |
| 2,428,670 | Hulse | Oct. 7, 1947 |
| 2,464,212 | Carter et al. | Mar. 15, 1949 |
| 2,467,938 | Kennedy | Apr. 19, 1949 |

FOREIGN PATENTS

| Number | Country | Date |
|---|---|---|
| 369,950 | Germany | Feb. 24, 1923 |
| 394,478 | Great Britain | June 29, 1933 |
| 688,169 | Germany | Feb. 14, 1940 |